UNITED STATES PATENT OFFICE.

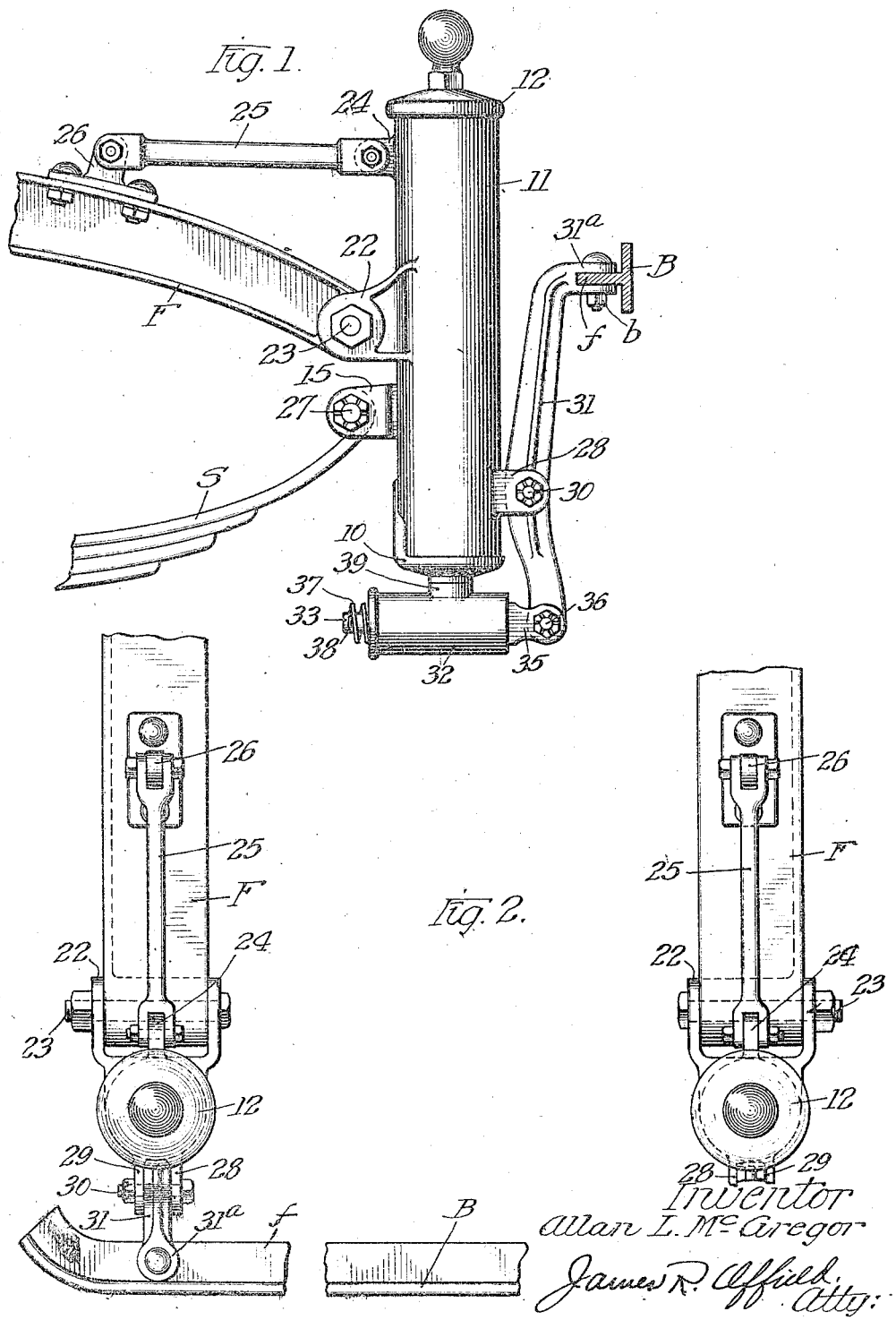

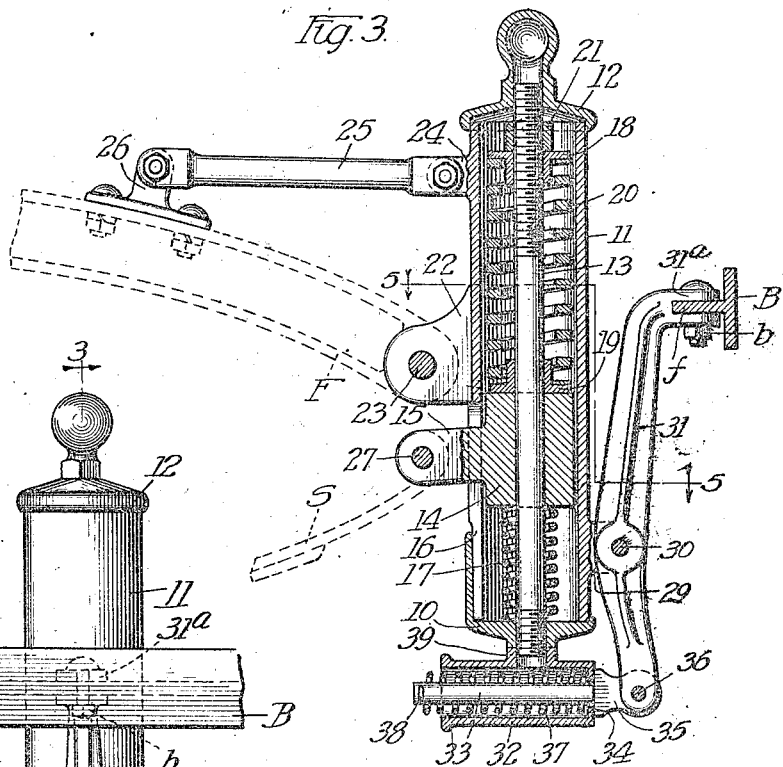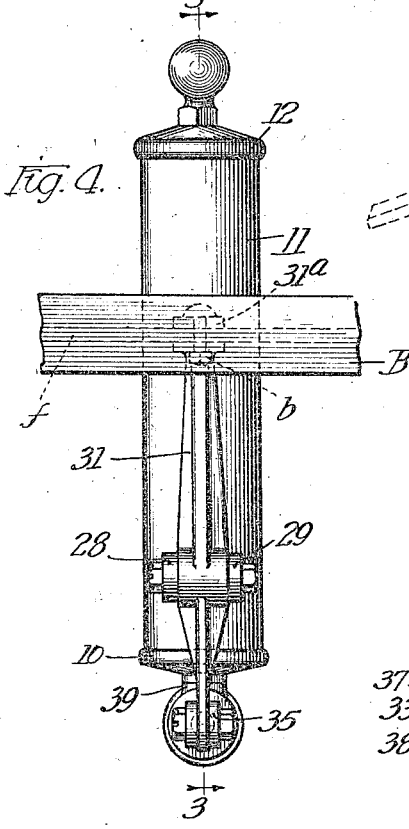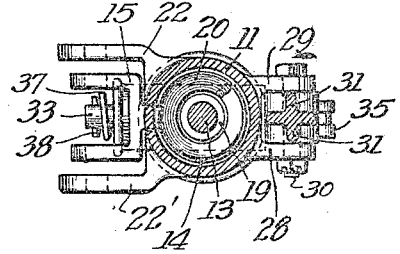

ALLAN L. McGREGOR, OF CHICAGO, ILLINOIS.

COMBINED SHOCK-ABSORBER AND BUMPER STRUCTURE.

1,260,926.

Specification of Letters Patent.

Patented Mar. 26, 1918.

Application filed December 3, 1915. Serial No. 64,815.

*To all whom it may concern:*

Be it known that I, ALLAN L. McGREGOR, a citizen of the United States, and a resident of Chicago, in the county of Cook and State of Illinois, have invented certain new and useful Improvements in Combined Shock-Absorbers and Bumper Structures, of which the following is a specification.

My invention relates to a combined shock absorber and bumper structure for vehicles, the object being to provide a simple, compact and efficient unitary structure for absorbing and protecting against shocks and bumps, the invention being an improvement over the arrangement heretofore used in which the shock absorber and the bumper are separate and independent attachments.

On the accompanying drawings which illustrate the various features of my invention—

Figure 1 is a side elevational view of the end of one of the side beams of a vehicle and the corresponding vehicle spring with my improved combination shock absorber and bumper structure applied thereto, Fig. 2 is a plan view of the front ends of the two side beams of a vehicle with my improved attachment applied thereto, Fig. 3 is a side elevational view with the attachment in vertical diametral section, Fig. 4 is a front elevational view of the attachment, and Fig. 5 is a sectional view on plane 5—5, Fig. 3.

Describing the attachment, a sleeve base 10 receives the lower end of the cylinder 11 which has the cap 12, a tie rod 13 extending through the cylinder and having threaded engagement with the cap and base to rigidly secure the parts together. Slidable on the tie rod near the lower end thereof is an abutment block 14 having the fork 15 extending outwardly therefrom through the slot 16 provided in the cylinder. Between this block and the base 10 the tie rod is encircled by a light compression spring 17. Upper and lower thimbles 18 and 19 encircling the tie rod receive between them the heavy compression spring 20, the thimble 19 abutting against the block 14 and the thimble 18 abutting against the collar or nut 21 threaded on the tie rod at the upper end thereof. By adjusting the collar or nut normal compression force of the springs can be regulated. Parallel lugs 22 and 22′ extend rearwardly from the cylinder about midway thereof and receive between them the front end of the vehicle side beam F on the bolt 23. A lug 24 extending rearwardly from the upper end of the cylinder has secured thereto the front end of a brace link 25 whose rear end is secured to the fitting 26 on the beam B. The fork 15 extending from the block 14 receives the front end of the vehicle spring S on the bolt 27. The shock absorber described operates in the well known manner, the two springs coöperating to absorb the shocks as the vehicle is traveling.

Extending forwardly from the cylinder at its lower end are the parallel ears 28 and 29 supporting a bolt 30 on which a lever 31 is pivoted at an intermediate point. The upper end 31ª of the lever 31 extends forwardly and is bifurcated to receive the flange *f* of the bumper B of T-shaped cross section, a bolt *b* securing the bumper in place. To the lower end of the shock absorber cylinder is secured a transversely extending cylinder 32 through which extends the stem 33. The front end of the stem projects through the opening 34 of the cylinder and has the bifurcated head 35 to which is pivoted the lower end of the lever 31 by means of a bolt 36. A compression spring 37 within the cylinder 32 is confined between the front end of the cylinder and a pin 38 extending through the rear end of the stem, this spring resisting forward pull of the stem. The transverse cylinder 32 may be secured to the shock absorber cylinder 11 in any manner. As shown, it has the upwardly extending threaded lug 39 for receiving the lower projecting end of the tie rod 13.

As illustrated in Fig. 2, one of my improved attachments is applied at the front end of each side beam of the vehicle with the bumper B extending across the vehicle and supported at its ends on the respective levers 31. Bumps against the fender are absorbed by the spring 37 as the bumper is pushed rearwardly and the levers 31 are rotated.

The improved shock absorber-bumper attachment described is very compact and efficient and has a neat appearance and can be very readily applied to a vehicle at either or both ends thereof, and the unitary structure is a decided improvement over prior arrangements involving separate shock absorber and bumper structures. Furthermore, by combining the two structures as I have into a compact unitary structure the cost is greatly reduced.

I do not desire to be limited to the precise construction and arrangement herein shown and described as modifications may be possible which would still come within the scope of the invention.

I claim as follows:

1. In a combined shock absorber and bumper structure for vehicles, the combination of a shock absorber cylinder, shock absorber mechanism therein, a spring barrel on said cylinder, a plunger in said spring barrel and a spring therein for resisting movement of the plunger, and means for connecting said plunger with a bumper bar.

2. In a combined shock absorber and bumper structure for vehicles, the combination of a cylinder, shock absorber mechanism therein, a spring barrel secured to the lower end of said cylinder extending transversely thereof, a plunger extending through said barrel and a spring in the barrel resisting the movement of the plunger, a lever pivoted at an intermediate point to the front of said shock absorber cylinder and connected at its lower end with said plunger, and means for connecting the upper end of said lever with a bumper bar.

In witness whereof I hereunto set my hand this 30th day of November, A. D. 1915.

ALLAN L. McGREGOR.